Patented Sept. 22, 1953

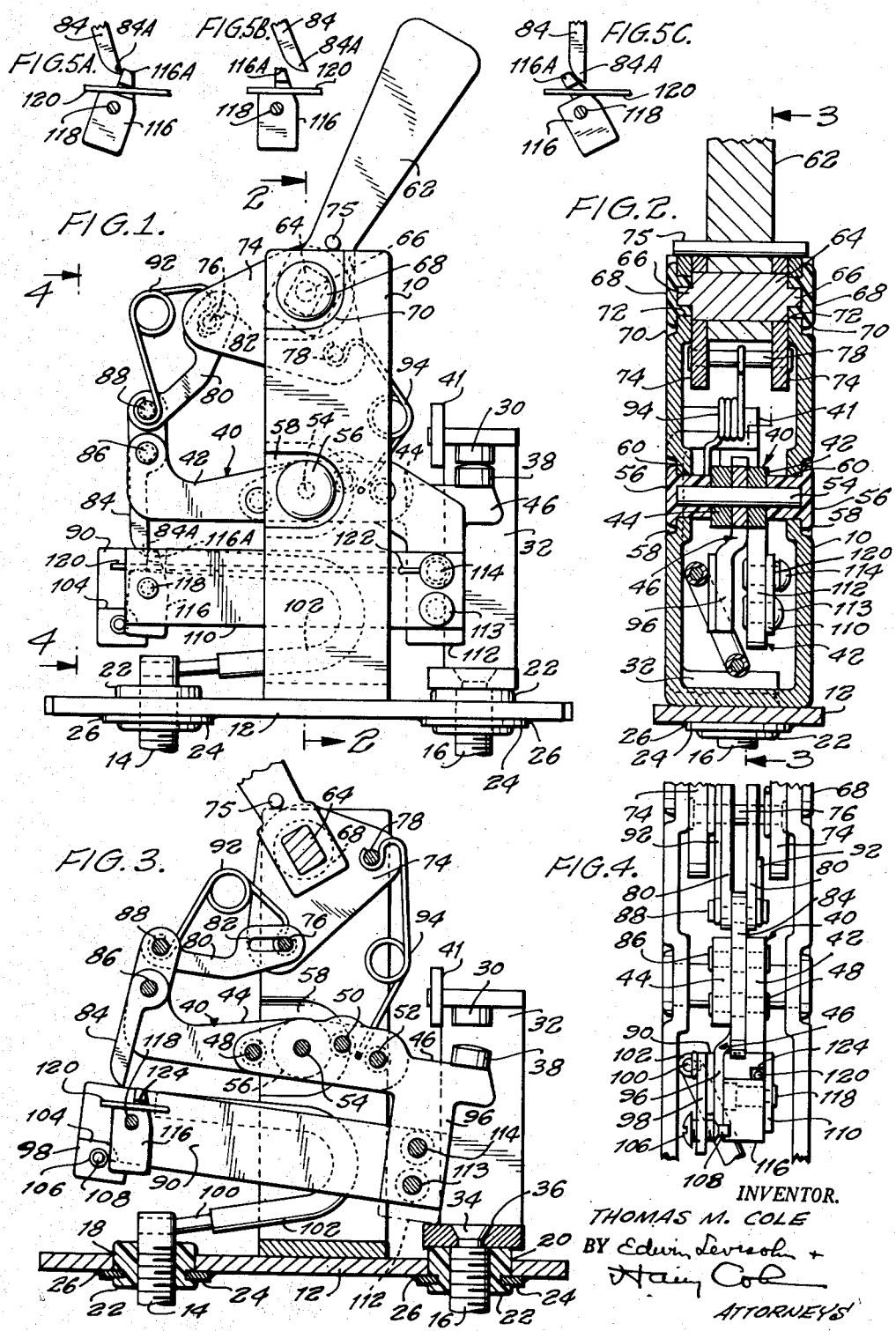

2,653,202

UNITED STATES PATENT OFFICE 2,653,202

AUTOMATIC CIRCUIT BREAKER WITH COMPENSATION PROVISION FOR AMBIENT TEMPERATURE AND MECHANICAL SHOCK

Thomas M. Cole, New York, N. Y., assignor to Federal Electric Products Company, Newark, N. J., a corporation of Delaware Application June 29, 1951, Serial No. 234,303

20 Claims. (Cl. 200—116)

1

My present invention relates, in general, to automatic circuit breakers, and in particular to a circuit breaker which is compensated for changes in ambient temperature, as well as for mechanical shock.

In circuit breakers of the type provided with a thermally responsive control device or latch, which operates to open the breaker when the current therethrough reaches a predetermined magnitude which, in turn, generates a predetermined temperature sufficient to operate the control device, it will be apparent that the circuit breaker will open when the ambient temperature reaches said predetermined temperature regardless of the current magnitude through the breaker. Moreover, when the ambient temperature is quite low, the current may have to reach a greater magnitude than the predetermined magnitude in order to generate the temperature required to operate the thermal control device. The problem of temperature compensation arises especially where the circuit breakers are subjected to ambient temperatures encountered in high altitudes, in deserts, in arctic areas, etc., or to the ambient temperatures of heating or refrigerating equipment. For example, an airplane which flies at an altitude of 50,000 feet, passes through temperatures which may range from −55° C. to +55° C. Therefore, it is an object of the present invention to provide, in a circuit breaker having a thermally responsive control element, means to compensate for changes in ambient temperature.

In circuit breakers of the type in which an actuator is pivotally carried by the movable contact member and is latched thereto, under the control of a current-responsive device, it is possible for the actuator, as a result of mechanical shock or vibration to which the breaker may be subjected, to be unlatched to open the breaker. For example, where the breaker is mounted on a moving vehicle or airplane, the mechanical shocks to which the vehicle is subjected will be transmitted to the breaker. Therefore, it is another object of the present invention to provide a circuit breaker of this type which is compensated to prevent the opening thereof due to mechanical shock or vibration.

The above and other objects, features and advantages of the present invention will be more fully understood from the following description considered in connection with the accompanying illustrative drawings.

In the drawings:

Fig. 1 is a side elevation of a circuit breaker pursuant to the present invention, the breaker being in the circuit closed or "on" condition thereof, and its cover or housing being removed;

Fig. 2 is a sectional view taken along the line 2—2 of Fig. 1;

Fig. 3 is a sectional view taken along the line 3—3 of Fig. 2, the breaker being in the circuit open or "off" condition thereof;

Fig. 4 is an end view as seen from the line 4—4 in Fig. 1; and

Figs. 5A, 5B and 5C are more or less diagrammatic views which illustrate the operation of portions of the circuit breaker mechanism.

Referring now to the drawings in detail, the circuit breaker of the present invention, as here shown, is provided with a U-shaped preferably metallic frame 10, the base of which is suitably secured, as by welding or brazing, to a preferably metallic mounting plate 12. It will be understood that the mounting plate, the frame and the hereinafter described circuit breaker mechanism carried thereby, are enclosed within a suitable casing or housing (not illustrated). Said mounting plate is provided with a load terminal 14 and a line terminal 16. More specifically, the mounting plate is apertured as at 18 and 20, repectively, as illustrated in Fig. 3. An insulated grommet 22 is disposed in each of said apertures, being retained therein by a metallic washer 24 which is welded or otherwise secured to the mounting plate 12, as at 26. Each of said load and line terminals is carried by its companion grommet in insulated relation from the mounting plate 12.

The stationary contact 30 of the circuit breaker is carried by a U-shaped terminal member 32 which is mounted on the insulating grommet associated with the line terminal 16. Said line terminal has an axially extending portion 34 of reduced diameter which is secured in an aperture 36 formed in one arm of the terminal member 32, as illustrated in Fig. 3, whereby a good mechanical and electrical connection is obtained between the line terminal and said terminal member. It will be apparent that the insulated grommet 22 insulates the terminal member 32 from the mounting plate 12.

The stationary contact 30 is positioned by the terminal member 32 to be engaged by the movable contact 38 carried by the movable contact member 40. An insulated member 41 mounted on the terminal member 32 adjacent the stationary contact 30 serves as a shield to deflect from the circuit breaker mechanism any arcing which may occur upon disengagement of said contacts. Said movable contact member comprises the spaced insulated parts 42 and 44 and the conducting part 46 which carries the movable contact 38 and which is secured in position between said insulating parts, as indicated at 48, 50 and 52. Said movable contact member is mounted for pivotal movement on the frame 10. More specifically, the movable contact member is provided with a pivot pin 54, the outer ends of which are provided with the insulated caps 56—56, as best illustrated in Fig. 2. It will be noted that the frame 10 is pressed in at the opposite sides thereof, as at 58-58, and that the aforementioned insulated caps extend through apertures 60 formed in said pressed-in portion whereby said caps are flush with the outer surfaces of the frame 10, as illustrated in Fig. 2. It will be readily apparent that said insulated caps serve to insulate the conducting portion 46 of the movable contact member from the frame 10. Therefore, it will be apparent that the movable contact member is mounted for pivotal movement between the upstanding arms of the frame 10 to and from the circuit closed position illustrated in Fig. 1 in which the movable contact 38 engages the stationary contact 30, and to and from the circuit open position illustrated in Fig. 3, in which said movable contact 38 is shown disengaged from said stationary contact 30.

This movement may be accomplished manually by the handle 62 which is mounted for pivotal movement on the frame 10. More specifically, the handle is provided with a pivot member 64 having the reduced end portions 66—66, each of which is provided with an insulated cap 68. In order to accommodate said caps 68, the frame is pressed in at the opposite sides thereof as at 70, and said pressed-in portions are apertured as at 72. The caps 68 extend into said apertures 72 and are disposed flush with the outer surfaces of the frame 10, as best illustrated in Fig. 2. Insulated handle yokes 74—74 are mounted on the handle pivot 64, being disposed between the handle 62 and the adjacent surfaces of the frame 10. Said yokes are preferably substantially triangular in conformation, the apex thereof being disposed adjacent the handle stop 75 and opposite portions thereof extending laterally from said handle. Said laterally extending portions mount the pivot members 76 and 78, respectively, at opposite ends of said yokes. The pivot member 76 mounts the companion rigid links 80—80, each of which is provided at one end thereof with an elongated slot 82. At the opposite end thereof said links are connected to an actuator 84 which is pivotally mounted between the insulated portions 42 and 44 of the movable contact member 40 by means of a pivot pin 86. More specifically, the upper end of the actuator 84 is connected between the ends of said links by a pivot pin 88. The actuator is operatively connected to the movable contact member 40 for moving the latter under the control of a current responsive flexible bimetallic latch 90, as hereinafter described in detail. It will also be noted that companion springs 92—92 interconnect the aforementioned pivot pins 76 and 88 for a purpose hereinafter described in detail. A coil spring 94 interconnects the aforementioned pin 78 and the movable contact member 40 for biasing the latter to the open circuit position thereof.

Pursuant to the present invention, the aforementioned bimetallic latch 90 completes the circuit through the circuit breaker, one end thereof being mounted on a laterally offset depending portion 96 of the conductive part 46 of the movable contact member 40. At its other end thereof, said bimetallic latch is provided with a metallic bracket 98 to which there is connected one end of a flexible conductor 100, the other end thereof being connected to the load terminal 14, as illustrated in Fig. 3, to complete the circuit through the circuit breaker. As here shown, said flexible conductor is enclosed within an insulated covering 102. It will be noted that the bimetallic latch 90 is cut away, as at 104, so that the bracket 98 extends below the bottom thereof at the free end thereof, and an adjustable latch element or screw 106 is in threaded engagement in the bracket 98 for adjustment transversely thereof. It will be noted also that said screw is provided, opposite the slotted portion thereof, with a non-threaded axially extending portion 108, the function of which is hereinafter described. It will be understood that upon the occurrence of an overload, or other predetermined current condition in the circuit breaker, the latch 90 will flex toward the left, viewing Fig. 4, whereby to carry the bracket 98 and the latch member 106 in said direction.

In order to compensate for variations in ambient temperature and/or for mechanical shock or vibration to which the circuit breaker may be subjected, provision is made, pursuant to the present invention, for an additional flexible bimetallic member or compensator 110. As here shown, the bimetal 110, at one end thereof, is secured to depending portion 112 of the insulating part 42 of the movable contact member 40 as by the rivets 113 and 114. It will be understood that the compensating bimetal 110 is adapted to flex in the same direction as the aforementioned bimetallic latch 90. However, it will be apparent that since the bimetal 110 is connected to an insulated portion of the movable contact member 40, said bimetal 110 does not carry any of the current which passes through the circuit breaker and therefore is not subjected to the temperature generated thereby. It will be noted that the bimetal 110 is disposed in parallel relationship with the latch 90, and since the latter is secured to the previously mentioned laterally offset portion 96 of the conductive part 46 of the movable contact member, said bimetals are in mutually laterally spaced disposition.

At the free end thereof, the compensating bimetal 110 is provided with a catch 116 which is pivotally mounted thereon, as at 118. As illustrated in Fig. 4, said catch is disposed in the space between both bimetals. A wire spring 120 has one end thereof secured to the outer surface of the compensating bimetal 110 by the aforementioned rivet 114, said spring extending through an aperture 122 formed in the latter bimetal and passing through a recessed portion 124 formed in the previously mentioned catch 116, as best illustrated in Fig. 4. It will be understood that said spring 120 tends to bias the catch 116 to align the latter in the position thereof illustrated in Fig. 3 and in Fig. 5B.

In the "on" or closed condition of the circuit breaker, as illustrated in Fig. 1, the free end 84A of the actuator 84 is in latched engagement with the setback portion 116A of the catch 116. It will be noted that in said condition of the circuit breaker, the actuator is in operative engagement with the movable contact member 40 through the bimetallic latch 90, the latter being provided with the previously mentioned adjustable latch element 106, the extending part 108 thereof engaging the catch 116, as illustrated in Fig. 1, to prevent the pivotal movement of the latter. The aforementioned springs 92 cooperate with the actuator 84, in the closed condition of the circuit breaker, to form an overset toggle therewith. It will be noted that the center axis of said toggle, constituted by the pivot 88, is disposed to the left of a straight line extending between the pivotal axes at 86 and 76, viewing Fig. 1, whereby the actuator 84 is retained in latched engagement with the movable contact member 40 through the catch 116, the latch element 106, and the bimetallic latch 90. It will be apparent that upon the occurrence of an overload, or other predetermined current condition, the latch 90 will flex toward the left, viewing Fig. 4, whereby to carry the portion 108 of element 106 in said direction and out of engagement with the catch 116 whereupon the toggle will collapse. Upon said collapse of the toggle, the spring 94 will be effective to pivot the movable contact member 40 in a direction to disengage the movable contact 38 from the stationary contact 30. More specifically, upon said collapse of the toggle, the actuator 84 will initially pivot in a counterclockwise direction, viewing Fig. 1, whereupon the catch 116 will pivot in a clockwise direction, as illustrated in Fig. 5A. The actuator will continue to pivot in the same direction until it disengages the catch 116, as illustrated in Fig. 5B, the latter being returned to a substantially vertical disposition by the alignment spring 120. It will be noted that the springs 92 cooperate with the handle 62 to form a second toggle therewith which is in overset relation in the closed condition of the circuit breaker. More specifically, it will be noted that the pivotal axis constituted by the pin 76 is disposed to the left of a straight line running between the pivotal axes at 88 and 66, viewing Fig. 1. Said latter toggle tends to retain the handle in the circuit closed condition thereof against the bias exerted thereupon by the spring 94. However, it will be apparent that said latter toggle will collapse upon the collapse of said first mentioned toggle whereupon the handle will move to the open circuit condition thereof, illustrated in Fig. 3. During said movement of the handle, the pin 76 will ride in the aforementioned slots 82 in the links 80 whereupon the actuator 84 will be pivoted by said links in a clockwise direction, viewing Fig. 1. During said latter pivotal movement of the actuator, the free end thereof will move from the position illustrated in Fig. 5B to engage the portion 116A of the catch 116, as illustrated in Fig. 5C, to pivot said catch in a counterclockwise direction until the actuator returns to the reset position thereof, as illustrated in Fig. 3. The spring 120 will be effective to return the catch 116 to the position thereof illustrated in Fig. 3 from the position thereof illustrated in Fig. 5C. It will be noted that in said position the front edge of catch 116 is spaced rearwardly of extending part 108 of the latch element 106. Consequently, it will be understood that when the bimetal 90 cools, the catch 116 will not prevent the return of the extending part 108 to a position immediately in front of the front edge of the catch so that the circuit breaker may be relatched when the handle is moved to the closed position thereof, as in Fig. 1. As illustrated in Fig. 3, the movement of the movable contact member 40, to the open circuit position thereof is limited by the engagement of the free end of depending portion 112 thereof with the terminal member 32.

It will be noted that in the circuit closed condition of the circuit breaker, the pin 76 is disposed inwardly of the ends of the slots 82 whereupon the springs 92, due to said lost motion connection between the handle and the links 80, are effective to resiliently bias the movable contact member 40 in a direction toward the stationary contact 30 to press the movable contact 38 thereagainst to compensate for wear and inequalities.

In the event that the circuit breaker is subjected to ambient temperature conditions, which would be effective to flex the current conducting bimetallic latch 90 in a direction to remove the part 108 of latch element 106 from engagement with the catch 116 whereby to trip the circuit breaker, it will be understood that said flexing will be compensated for by the compensating thermal member 110. More specifically, it will be apparent that said compensating member, being subjected to the same ambient temperature, will flex in the same direction as the bimetallic latch 90 whereby the catch 116 is carried in the same direction as the retaining part 108 whereby the tripping of the circuit breaker due to flexing of latch 90 by said ambient temperatures will be prevented. However, it will be readily apparent that the bimetallic catch 90 upon being subjected to a current overload or other abnormal current condition, will flex independently of the compensating bimetal 110 so that the circuit breaker will respond by tripping upon the occurrence of said abnormal current conditions.

In addition to compensating for variations in heat energy, in the form of variations in ambient temperature, to which the circuit breaker may be subjected, it will be understood that the compensating bimetal 110 will also compensate for variations in mechanical energy, in the form of mechanical shock or vibration to which the circuit breaker may be subjected. In this connection, it will be readily understood that any mechanical shock or vibration which would cause the latch 90 to flex in a direction to trip the circuit breaker, would also be applied to the compensating bimetal 110. Consequently, said compensating bimetal will flex in the same direction as the bimetallic latch whereby to prevent the disengagement of the retaining part 108 from the catch 116 in the same manner as for the previously described ambient temperature compensation.

As previously indicated, the latch element 106 is threaded into the bracket 98. Therefore, calibration of the circuit breaker may be accomplished by adjusting said element 106 axially thereof whereby to vary the extent by which the retaining part 108 thereof overlies the catch 116.

Certain features described herein are the invention of Paul M. Christensen and are claimed in his application Serial No. 234,297, filed concurrently herewith, said application being owned by the assignee hereof.

The subject matter of the present application is related also to the copending application of Tracy B. Taylor and Gustav A. Duve, Serial Number 360,522, filed June 9, 1953 and assigned to assignee hereof.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent, is:

1. In a circuit breaker having relatively movable contacts engageable with and disengageable from each other for making and breaking the circuit, a movable member carrying one of said contacts and mechanism, including a current responsive flexible bimetal latch and a companion releasable catch in predetermined relation, for actuating said movable member to make and break the circuit under the control of said latch and catch; means in combination with said latch for compensating for flexing of said bimetal in response to energy variations to which said circuit breaker may be subjected, whereby to substantially neutralize the effects of said energy variations, said compensating means being operable upon said catch for concomitantly moving said catch in relation to said latch for maintaining said predetermined latch and catch relation substantially constant through a range of said energy variations.

2. In a circuit breaker having relatively movable contacts engageable with and disengageable from each other for making and breaking the circuit, a movable member carrying one of said contacts and mechanism, including a current responsive flexible bimetal latch and a companion releasable catch in predetermined relation, for actuating said movable member to make and break the circuit under the control of said latch and catch; means in combination with said latch for compensating for flexing of said bimetal in response to ambient temperature variations, whereby to substantially neutralize the effect of ambient temperature variations on said latch, said means comprising a compensating thermal responsive member positioned in juxtaposition to said bimetal latch and operable on said catch in response to said ambient temperature variations for concomitantly moving said catch in relation to said latch for maintaining said predetermined latch and catch relation substantially constant throughout a range of ambient temperatures.

3. In a circuit breaker having relatively movable contacts engageable with and disengageable from each other for making and breaking the circuit, a movable member carrying one of said contacts and mechanism, including a current responsive flexible bimetal latch and a companion releasable catch in predetermined relation, for actuating said movable member to make and break the circuit under the control of said latch and catch; means in combination with said latch for compensating for flexing of said bimetal in response to energy variations to which said circuit breaker may be subjected, whereby to substantially neutralize the effects of said energy variations for concomitantly moving said catch in relation to said latch for maintaining said predetermined latch and catch relation substantially constant through a range of said energy variations, said energy variations being variations in mechanical energy, and said compensating member being a flexible member arranged to flex in the same direction as said latch and in substantially the same amount as the latter in response to the variations in mechanical energy to which the circuit breaker is subjected.

4. In a circuit breaker having relatively movable contacts engageable with and disengageable from each other for making and breaking the circuit, a movable member carrying one of said contacts and mechanism, including a current responsive flexible bimetal latch and a companion releasable catch in predetermined relation, for actuating said movable member to make and break the circuit under the control of said latch and catch; means in combination with said latch for compensating for flexing of said bimetal in response to ambient temperature variations, whereby to substantially neutralize the effect of ambient temperature variations on said latch, said means comprising a compensating thermal responsive member positioned in juxtaposition to said bimetal latch and operable on said catch in response to said ambient temperature variations for concomitantly moving said catch in relation to said latch for maintaining said predetermined latch and catch relation substantially constant throughout a range of ambient temperatures, said latch bimetal and said compensating thermal responsive member being carried by said movable contact member, said catch being carried by said thermal responsive member, said catch being pivotally movable on said compensating member and normally releasably restrained by said latch against pivotal movement in one direction, said mechanism for actuating said movable contact member comprising an actuator operatively connected to said movable contact member under the control of said catch when the latter is restrained by said latch, and manually operable means operatively connected to said actuator for moving the latter and thereby moving said movable contact member to engage and disengage said contacts.

5. In a circuit breaker having relatively movable contacts engageable with and disengageable from each other for making and breaking the circuit, a movable member carrying one of said contacts and mechanism, including a current responsive flexible bimetal latch and a companion releasable catch in predetermined relation, for actuating said movable member to make and break the circuit under the control of said latch and catch; means in combination with said latch for compensating for flexing of said bimetal in response to said ambient temperature variations whereby to substantially neutralize the effect of ambient temperature variations on said latch, said means comprising a compensating thermal responsive member positioned in juxtaposition to said bimetal latch and operable on said catch in response to said ambient temperature variations for concomitantly moving said catch in relation to said latch for maintaining said predetermined latch and catch relation substantially constant throughout a range of ambient temperatures, said latch bimetal and said compensating thermal responsive member being carried by said movable contact member, said catch being carried by said thermal responsive member, said catch being pivotally movable on said compensating member and normally releasably restrained by said latch against pivotal movement in one direction, said mechanism for actuating said movable contact member comprising an actuator operatively connected to said movable contact member under the control of said catch when the latter is restrained by said latch, and manually operable means operatively connected to said actuator for moving the latter and thereby moving said movable contact member to engage and disengage said contacts, and spring means biasing said movable contact member and automatically operable to move said movable contact member to disengage said contacts when said latch releases said catch.

6. In a circuit breaker having relatively movable contacts engageable with and disengageable from each other for making and breaking the circuit, a movable member carrying one of said contacts and mechanism, including a current responsive flexible bimetal latch and a companion releasable catch in predetermined relation, for actuating said movable member to make and break the circuit under the control of said latch and catch; means in combination with said latch for compensating for flexing of said bimetal in response to ambient temperature variations, whereby to substantially neutralize the effect of ambient temperature variations on said latch, said means comprising a compensating thermal responsive member positioned in juxatposition to said bimetal latch and operable on said catch in response to said ambient temperature variations for concomitantly moving said catch in relation to said latch for maintaining said predetermined latch and catch relation substantially constant throughout a range of ambient temperatures, said compensating thermal responsive member comprising a flexible bimetal strip arranged to flex in the same direction as said latch bimetal and in substantially the amounts as the latter in response to the ambient temperature variations.

7. In a circuit breaker having relatively movable contacts engageable with and disengageable from each other for making and breaking the circuit, a movable member carrying one of said contacts and mechanism, including a current responsive flexible bimetal latch and a companion releasable catch in predetermined relation, for actuating said movable member to make and break the circuit under the control of said latch and catch; means in combination with said latch for compensating for flexing of said bimetal in response to ambient temperature variations, whereby to substantially neutralize the effect of ambient temperature variations on said latch, said means comprising a compensating thermal responsive member positioned in juxtaposition to said bimetal latch and operable on said catch in response to said ambient temperature variation for concomitantly moving said catch in relation to said latch for maintaining said predetermined latch and catch relation substantially constant throughout a range of ambient temperatures, said compensating thermal responsive member comprising a flexible bimetal strip arranged to flex in the same direction as said latch bimetal and in substantially the same amount as the latter in response to the ambient temperature variations, said catch being carried by said compensating strip so that the relation between latch and catch is maintained constant irrespective of ambient temperature changes within a range of different temperatures.

8. In a circuit breaker having relatively movable contacts engageable with and disengageable from each other for making and breaking the circuit, a movable member carrying one of said contacts and mechanism, including a current responsive flexible bimetal latch and a companion releasable catch in predetermined relation, for actuating said movable member to make and break the circuit under the control of said latch and catch; means in combination with said latch for compensating for flexing of said bimetal in response to ambient temperature variations, whereby to substantially neutralize the effect of ambient temperature variations on said latch, said means comprising a compensating thermal responsive member positioned in juxtaposition to said bimetal latch and operable on said catch in response to said ambient temperature variations for concomitantly moving said catch in relation to said latch for maintaining said predetermined latch and catch relation substantially constant throughout a range of ambient temperatures, said compensating thermal responsive member comprising a flexible bimetal strip arranged to flex in the same direction as said latch bimetal and in substantially the same amount as the latter in response to the ambient temperature variations, said catch being carried by said compensating strip so that the relation between latch and catch is maintained constant irrespective of ambient temperature changes within a range of different temperatures, said catch being movable on said compensating strip and held releasably against movement in one direction by said latch which is operable to release said catch upon predetermined flexing of said latch bimetal due to heating thereof in response to current conditions of the circuit, said mechanism including an actuating member which is releasably restrained by said catch when the latter is held against said movement and which when restrained in turn prevents movement of the catch in an opposite direction, said actuating member when restrained by said catch being operatively connected to said movable contact member and being released from said operative connection when released by said catch.

9. In a circuit breaker having relatively movable contacts engageable with and disengageable from each other for making and breaking the circuit, a movable member carrying one of said contacts and mechanism, including a current responsive flexible bimetal latch and a companion releasable catch in predetermined relation, for actuating said movable member to make and break the circuit under the control of said latch and catch; means in combination with said latch for compensating for flexing of said bimetal in response to ambient temperature variations, whereby to substantially neutralize the effect of ambient temperature variations on said latch, said means comprising a compensating thermal responsive member positioned in juxtaposition to said bimetal latch and operable on said catch in response to said ambient temperature variations for concomitantly moving said catch in relation to said latch for maintaining said predetermined latch and catch relation substantially constant throughout a range of ambient temperatures, said compensating thermal responsive member comprising a flexible bimetal strip arranged to flex in the same direction as said latch bimetal and in substantially the same amount as the latter in response to the ambient temperature variations, said catch being carried by said compensating strip so that the relation between said latch and catch is maintained constant irrespective of ambient temperature changes within a range of different temperatures, said catch being movable on said compensating strip and held releasably against movement in one direction by said latch which is operable to release said catch upon predetermined flexing of said latch bimetal due to heating thereof in response to current conditions of the circuit, said mechanism including an actuating member which is releasably restrained by said catch when the latter is held against said movement and which when restrained in turn prevents movement of the catch in an opposite direction, said actuating member when restrained by said catch being operatively connected to said movable contact member and being released from said operative connection when released by said catch, manually operable means connected to said actuating member for moving said movable contact member to engage said contacts only when said actuating member is operatively connected thereto, and spring means biasing said movable contact member to disengage said contacts and operable on said movable contact to disengage said contacts when said latch releases said catch for said movement thereof.

10. In a circuit breaker having relatively movable contacts engageable with and disengageable from each other for making and breaking the circuit, a movable member carrying one of said contacts and mechanism, including a current responsive flexible bimetal latch and a companion releasable catch in predetermined relation, for actuating said movable member to make and break the circuit under the control of said latch and catch; means in combination with said latch for compensating for flexing of said bimetal in response to ambient temperature variations, whereby to substantially neutralize the effect of ambient temperature variations on said latch, said means comprising a compensating thermal responsive member positioned in juxtaposition to said bimetal latch and operable on said catch in response to said ambient temperature variations for concomitantly moving said catch in relation to said latch for maintaining said predetermined latch and catch relation substantially constant throughout a range of ambient temperatures, said compensating thermal response member comprising a flexible bimetal strip arranged to flex in the same direction as said latch bimetal and in substantially the same amount as the latter in response to the ambient temperature variations, said catch being carried by said compensating strip so that the relation between said latch and catch is maintained constant irrespective of ambient temperature changes within a range of different temperatures, said catch being movable on said compensating strip and held releasably against movement in one direction by said latch which is operable to release said catch upon predetermined flexing of said latch bimetal due to heating thereof in response to current conditions of the circuit, said mechanism including an actuating member which is releasably restrained by said catch when the latter is held against said movement and which when restrained in turn prevents movement of the catch in an opposite direction, said actuating member when restrained by said catch being operatively connected to said movable contact member and being released from said operative connection when released by said catch, manually operable means connected to said actuating member for moving said movable contact member to engage said contacts only when said actuating member is operatively connected thereto, and spring means biasing said movable contact member to disengage said contacts and operable on said movable contact to disengage said contacts when said latch releases said catch for said movement thereof, both of said bimetal strips and said actuating member being carried by and bodily movable with said movable contact member.

11. In a circuit breaker having relatively movable contacts engageable with and disengageable from each other for making and breaking the circuit, a movable member carrying one of said contacts and mechanism, including a current responsive flexible bimetal latch and a companion releasable catch in predetermined relation, for actuating said movable member to make and break the circuit under the control of said latch and catch; means in combination with said latch for compensating for flexing of said bimetal in response to mechanical shock to which said circuit breaker may be subjected, whereby to substantially prevent the tripping of said circuit breaker in response to said mechanical shock, said means comprising a compensating member positioned in juxtaposition to said bimetal latch and operable on said catch in response to said mechanical shock for concomitantly moving said catch in relation to said latch for maintaining said predetermined latch and catch relation substantially constant when said circuit breaker is subjected to mechanical shock, said latch bimetal and said compensating member being carried by said movable contact member, said catch being pivotally movable on said compensating member and normally releasably restrained by said latch against pivotal movement in one direction, said mechanism for actuating said movable contact member comprising an actuator operatively connected to said movable contact member under the control of said catch when the latter is restrained by said latch, and manually operable means operatively connected to said actuator for moving the latter and thereby moving said movable contact member to engage and disengage said contacts.

12. In a circuit breaker having relative movable contacts engageable with and disengageable from each other for making and breaking the circuit, a movable member carrying one of said contacts and mechanism, including a current responsive flexible bimetal latch and a companion releasable catch in predetermined relation, for actuating said movable member to make and break the circuit under the control of said latch and catch; means in combination with said latch for compensating for flexing of said bimetal in response to mechanical shock and vibration to which said circuit breaker may be subjected, whereby to substantially prevent the tripping of said circuit breaker in response to mechanical shock and vibration, said means comprising a compensating member positioned in juxtaposition to said bimetal latch and operable on said catch in response to mechanical shock and vibration for concomitantly moving said catch in relation to said latch for maintaining said predetermined latch and catch relation substantially constant when said circuit breaker is subjected to said mechanical shock and vibration, said compensating member being a flexible strip arranged to flex in the same direction as said latch and in substantially the amounts as the latter in response to mechanical shock and vibration.

13. In a circuit breaker having relatively movable contacts engageable with and disengageable from each other for making and breaking the circuit, a movable member carrying one of said contacts and mechanism, including a current responsive flexible bimetal latch and a companion releasable catch in predetermined relation, for actuating said movable member to make and break the circuit under the control of said latch and catch; means in combination with said latch for compensating for flexing of said bimetal in response to ambient temperature variations, whereby to substantially neutralize the effect of ambient temperature variations on said latch, said means comprising a compensating thermal responsive member positioned in juxtaposition to said bimetal latch and operable on said catch in response to said ambient temperature variations for concomitantly moving said catch in relation to said latch for maintaining said predetermined latch and catch relation substantially constant throughout a range of ambient temperatures, said compensating thermal responsive member comprising a flexible bimetal strip arranged to flex in the same direction as said latch bimetal and in substantially the same amount as the latter in response to the ambient temperature variations, said catch being carried by said compensating strip so that the relation between latch and catch is maintained constant irrespective of ambient temperature changes within a range of different temperatures, said catch being movable on said compensating strip, and said latch being provided with a latch element engageable with said catch for holding the latter releasably against movement in one direction, said element being operable, upon predetermined flexing of said latch due to heating thereof in response to current conditions of the circuit, to release said catch.

14. In a circuit breaker having relatively movable contacts engageable with and disengageable from each other for making and breaking the circuit, a movable member carrying one of said contacts and mechanism, including a current responsive flexible bimetal latch and a companion releasable catch in predetermined relation, for actuating said movable member to make and break the circuit under the control of said latch and catch; means in combination with said latch for compensating for flexing of said bimetal in response to ambient temperature variations, whereby to substantially neutralize the effect of ambient temperature variations on said latch, said means comprising a compensating thermal responsive member positioned in juxtaposition to said bimetal latch and operable on said catch in response to said ambient temperature variations for concomitantly moving said catch in relation to said latch for maintaining said predetermined latch and catch relation substantially constant throughout a range of ambient temperatures, said compensating thermal responsive member comprising a flexible bimetal strip arranged to flex in the same direction as said latch bimetal and in substantially the same amount as the latter in response to the ambient temperature variations, said catch being carried by said compensating strip so that the relation between latch and catch is maintained constant irrespective of ambient temperature changes within a range of different temperatures, said catch being movable on said compensating strip, and said latch being provided with a latch element engageable with said catch for holding the latter releasably against movement in one direction, said element being operable, upon predetermined flexing of said latch due to heating thereof in response to current conditions of the circuit, to release said catch, said element being adjustable relative to said catch for calibrating said circuit breaker.

15. In a circuit breaker having relative movable contacts engageable with and disengageable from each other for making and breaking the circuit, a movable member carrying one of said contacts and mechanism, including a current responsive flexible bimetal latch and a companion releasable catch in predetermined relation, for actuating said movable member to make and break the circuit under the control of said latch and catch; means in combination with said latch for compensating for flexing of said bimetal in response to ambient temperature variations, whereby to substantially neutralize the effect of ambient temperature variations on said latch, said means comprising a compensating thermal responsive member positioned in juxtaposition to said bimetal latch and operable on said catch in response to said ambient temperature variations for concomitantly moving said catch in relation to said latch for maintaining said predetermined latch and catch relation substantially constant throughout a range of ambient temperatures, said compensating thermal responsive member comprising a flexible bimetal strip arranged to flex in the same direction as said latch bimetal and in substantially the same amount as the latter in response to the ambient temperature variations, said catch being carried by said compensating strip so that the relation between latch and catch is maintained constant irrespective of ambient temperature changes within a range of different temperatures, said catch being movable on said compensating strip, and said latch being provided with a latch element engageable with said catch for holding the latter releasably against movement in one direction, said element being operable, upon predetermined flexing of said latch due to heating thereof in response to current conditions of the circuit, to release said catch, and spring means for releasably retaining said catch in predetermined disposition thereof.

16. In a circuit breaker having relatively movable contacts engageable with and disengageable from each other for making and breaking the circuit, a movable member carrying one of said contacts, a pair of flexible members carried in predetermined disposition by said movable member, one of said flexible members being connected to flex due to heating thereof in response to current conditions of the circuit, both of said flexible members being adapted to flex substantially in similar amounts in response to energy variations, other than said heating, to which said circuit breaker may be subjected, and a releasable catch disposed in predetermined relation relative to said one flexible member to permit for actuation of said movable member to make and break the circuit under the control of said one flexible member and said catch, the other of said flexible members being operable upon said catch for maintaining said predetermined relation with said one flexible member substantially constant when said circuit breaker is subjected to said energy variations.

17. In a circuit breaker having relatively movable contacts engageable with and disengageable from each other for making and breaking the circuit, a movable member carrying one of said contacts, a pair of flexible members carried in predetermined disposition by said movable member, one of said flexible members being connected to flex due to heating thereof in response to current conditions of the circuit, both of said flexible members being adapted to flex substantially in similar amounts in response to energy variations, other than said heating, to which said circuit breaker may be subjected, and a releasable catch disposed in predetermined relation relative to said one flexible member to permit for actuation of said movable member to make and break the circuit under the control of said one flexible member and said catch, the other of said flexible members being operable upon said catch for maintaining said predetermined relation with said one flexible member substantially constant when said circuit breaker is subjected to said energy variations, said catch being carried by said other flexible member and means provided on said one flexible member for releasably retaining said catch against movement in one direction.

18. In a circuit breaker having relatively movable contacts engageable with and disengageable from each other for making and breaking the circuit, a movable member carrying one of said contacts, a pair of flexible members carried in predetermined disposition by said movable member, one of said flexible members being connected to flex due to heating thereof in response to current conditions of the circuit, both of said flexible members being adapted to flex substantially in similar amounts in response to energy variations, other than said heating, to which said circuit breaker may be subjected, and a releasable catch disposed in predetermined relation relative to said one flexible member to permit for actuation of said movable member to make and break the circuit under the control of said one flexible member and said catch, the other of said flexible members being operable upon said catch for maintaining said predetermined relation with said one flexible member substantially constant when said circuit breaker is subjected to said energy variations, said catch being carried by said other flexible member and means provided on said one flexible member for releasably retaining said catch against movement in one direction, said means being a latch element carried by said one flexible member and engageable with said catch.

19. In a circuit breaker having relatively movable contacts engageable with and disengageable from each other for making and breaking the circuit, a movable member carrying one of said contacts, a pair of flexible members carried in predetermined disposition by said movable member, one of said flexible members being connected to flex due to heating thereof in response to current conditions of the circuit, both of said flexible members being adapted to flex substantially in similar amounts in response to energy variations, other than said heating, to which said circuit breaker may be subjected, and a releasable catch disposed in predetermined relation relative to said one flexible member to permit for actuation of said movable member to make and break the circuit under the control of said one flexible member and said catch, the other of said flexible members being operable upon said catch for maintaining said predetermined relation with said one flexible member substantially constant when said circuit breaker is subjected to said energy variations, said catch being carried by said other flexible member and means provided on said one flexible member for releasably retaining said catch against movement in one direction, said means being a latch element carried by said one flexible member and engageable with said catch, said latch element being adjustable relative to said catch for calibrating said circuit breaker.

20. In a circuit breaker having relatively movable contacts engageable with and disengageable from each other for making and breaking the circuit, a movable member carrying one of said contacts, a pair of flexible members carried in predetermined disposition by said movable member, one of said flexible members being connected to flex due to heating thereof in response to current conditions of the circuit, both of said flexible members being adapted to flex substantially in similar amounts in response to energy variations, other than said heating, to which said circuit breaker may be subjected, and a releasable catch disposed in predetermined relation relative to said one flexible member to permit for actuation of said movable member to make and break the circuit under the control of said one flexible member and said catch for maintaining said predetermined relation with said one flexible member substantially constant when said circuit breaker is subjected to said energy variations, said catch being carried by said other flexible member and means provided on said one flexible member for releasably retaining said catch against movement in one direction, said flexible members being in mutual lateral disposition, and said catch being carried between opposing surfaces of said flexible members.

THOMAS M. COLE.

References Cited in the file of this patent

UNITED STATES PATENTS

| Number | Name | Date |
|---|---|---|
| 2,209,352 | Sachs et al. | July 30, 1940 |
| 2,210,262 | Sachs | Aug. 6, 1940 |
| 2,455,753 | Getchell | Dec. 7, 1948 |